United States Patent [19]

Niho et al.

[11] Patent Number: 5,248,976
[45] Date of Patent: Sep. 28, 1993

[54] MULTIPLE DISCRETE AUTOFOCUS

[75] Inventors: Yoji G. Niho, Rancho Palos Verdes; Ralph E. Hudson, Los Angeles; Tammy L. Flanders, Playa Del Rey, all of Calif.

[73] Assignee: Hughes Aircraft Company, Los Angeles, Calif.

[21] Appl. No.: 798,783

[22] Filed: Nov. 27, 1991

[51] Int. Cl.$^5$ .............................. G01S 13/90
[52] U.S. Cl. .................................... 342/25
[58] Field of Search ........................... 342/25

[56] References Cited

U.S. PATENT DOCUMENTS

| 4,924,229 | 5/1990 | Eichel et al. | 342/25 |
| 5,021,789 | 6/1991 | Shaw | 342/25 |
| 5,043,734 | 8/1991 | Niho | 342/25 |

Primary Examiner—T. H. Tubbesing
Attorney, Agent, or Firm—L. A. Alkov; W. K. Denson-Low

[57] ABSTRACT

A method and autofocus processor that is adapted to automatically correct focus phase errors associated with synthetic array radar signals. The method comprises processing the synthetic array radar signals to produce a SAR image; identifying and locating potential targets contained in the SAR image; storing the range bin and azimuth location of the target in a target list; bandpass filtering the SAR signals associated with the target scatterer to remove the interference therefrom; forming the pulse pair product of the phase history samples from each reference target to produce a differential phase function; integrating the differential phase function over all reference targets to provide the averaged differential phase history associated therewith; interpolating the averaged differential phase function to restore the original time scale and number of samples; and computing the focus error from interpolated differential phase history. The focus error is estimated as a weighted average of the phase history of the detected scatterers. The autofocus processor automatically finds targets and combines data from multiple scatterers effectively and efficiently. The autofocus processor extends the range and resolution limits of SAR systems, and enables the effective use of a SAR sensor with less expensive motion compensation function. The autofocus processor also decouples the SAR sensor (including motion sensors) from its SAR processor, so that the autofocus processor produces better images, no matter what sensor is employed.

13 Claims, 5 Drawing Sheets

MULTIPLE DISCRETE AUTOFOCUS

BACKGROUND

The present invention relates generally to synthetic array radar (SAR), and more particularly, to a method and apparatus, commonly know as autofocus, that automatically corrects SAR focus errors.

Synthetic array radar resolution and the utility of its imagery depend upon accurate focus correction. Conventional autofocus techniques include phase comparison autofocus, map drift autofocus and phase difference autofocus, all developed by Hughes Aircraft Company. These methods estimate coefficients of a polynomial that best characterizes the focus error in some sense. A polynomial representation is not always adequate, however, when the focus error history is highly non-linear and can not be accurately denoted by a polynomial of a lower order.

Nonconventional autofocus techniques that are capable of correcting a phase error of a very high order include a prominent scatter technique developed by the Environmental Research Institute of Michigan, a single target discrete autofocus developed by the Hughes Aircraft Company, and a phase derivative autofocus developed by Sandia National Laboratories. The prominent scatterer technique required a presence of an isolated point scatterer. The single target discrete autofocus technique did not require an isolated target. It also eliminated a need to unwrap phase data to create a continuous phase function. But, both the prominent scatterer and the single target discrete autofocus techniques were susceptible to a target dependent phase error since a phase correction signal was obtained from a single target. The single target discrete autofocus technique is described in U.S. Pat. No. 5,043,734, for "Discrete Autofocus for Ultra-High Resolution Synthetic Aperture Radar Imaging," assigned to the assignee of the present invention. An attempt to reduce target-dependent phase error did not succeed since a method could not be found to average phase data properly. This short fall was resolved by the Sandia's phase derivative autofocus by computing phase derivatives from many targets and averaging derivatives to eliminate target dependent phase errors. Averaged phase derivatives are then used to construct a phase correction signal with target-dependent errors substantially reduced. The Sandia system is described in a paper entitled, "A New Phase Correction Method for Synthetic Aperture Radar", by P. H. Eichel, et al., IEEE Conference on Digital Signal Processing, September 1988. The Sandia system is considered to be the closest related system to the present invention. Based upon the contents of this paper, however, it is believed that the Sandia's system does not optimally weight data from various scatterers, uses unnecessary iterations, and the window length design rational is undefined.

Consequently, there is a need for a nonconventional autofocus technique that optimally weighs data from various scatterers, eliminates unnecessary iterations, and selects window length optimally and adaptively in an efficient, cost effective manner.

SUMMARY OF THE INVENTION

In order to overcome the limitations of conventional and nonconventional autofocus techniques, the present invention provides for a processor that automatically estimates and corrects highly nonlinear focus phase errors in synthetic array radar data by extracting the differential phase data from multiple scatterers and creating a phase reference signal in an efficient, cost effective manner. The focus error is estimated by forming a weighted average of the differential phase history of the scatterers that are automatically selected based on some optimal criteria. The present invention combines differential phase data from multiple scatterers effectively and efficiently to provide an accurate focus error estimation with a single focusing iteration.

More specifically, the present invention is a method and processor apparatus that implements the following processing method which is adapted to automatically correct focus errors associated with synthetic array radar signals. The method comprises the following steps. (1) Processing the synthetic array radar signals to produce a SAR image with or without conventional autofocus. (2) Identifying and locating potential reference targets contained in the SAR image. (3) Storing the range bin and azimuth location of the selected reference targets in a target list. (4) Bandpass filtering the synthetic array radar signal associated with each target to remove the interference therefrom. (5) Forming the pulse pair product of the bandpass-filtered phase history samples to produce a differential phase function for each reference target. (6) Integrating the pulse pair product over all reference targets to obtain a summed differential phase function. (7) Processing the integrated pulse pair product signals, by interpolating, to restore the original time scale and number of data samples. (8) Computing the focus error from the time interpolated differential phase history.

The invention extends the range and resolution limits of synthetic array radar. The invention enables the effective use of a synthetic array radar sensor with a less expensive motion compensation function. The invention also decouples the synthetic array radar sensor (including motion sensors) from its synthetic array radar processor so that the processor of the present invention produces better images, no matter what sensor is employed.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
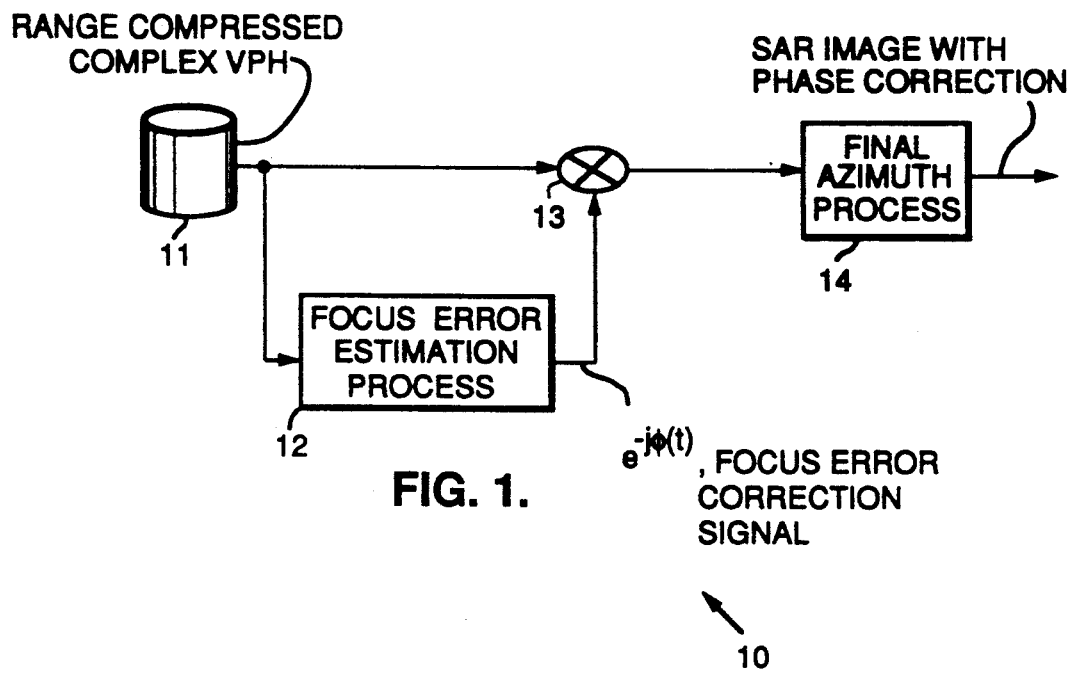
FIG. 1 illustrates an autofocus processing arrangement for use with a synthetic array radar processor that is standard for most autofocus techniques.

The present invention comprises an autofocus processor 10 which implements an autofocus computational process that is employed with a synthetic array radar processor. The autofocus processor 10 is designed for operation as indicated in FIG. 1. FIG. 1 illustrates an autofocus processing arrangement that is standard for most autofocus techniques. However, the details in the implementation of the present processor are different from conventional processors and processing techniques, as will be more fully described below. FIG. 1 shows a storage means 11 that stores input data for the autofocus processor 10, which consists of a means of estimating a focus phase error 12 and a means of removing the estimated phase error 13. The input data is range compressed complex video phase history (VPH) data of a SAR image that is to be processed. The range compressed complex VPH input data is coupled to a focus error estimation processor 12 whose output comprises the estimated phase error, $\phi(t)$, contained in the range compressed complex VPH data. The range compressed complex VPH data is multiplied with the complex conjugate of the phasor having the estimated focus error as its phase in a multiplier 13, thereby removing the focus phase error. With a focus phase error removed from the VPH data, a final azimuth process 14 produces a focused SAR image.

Figure 2:
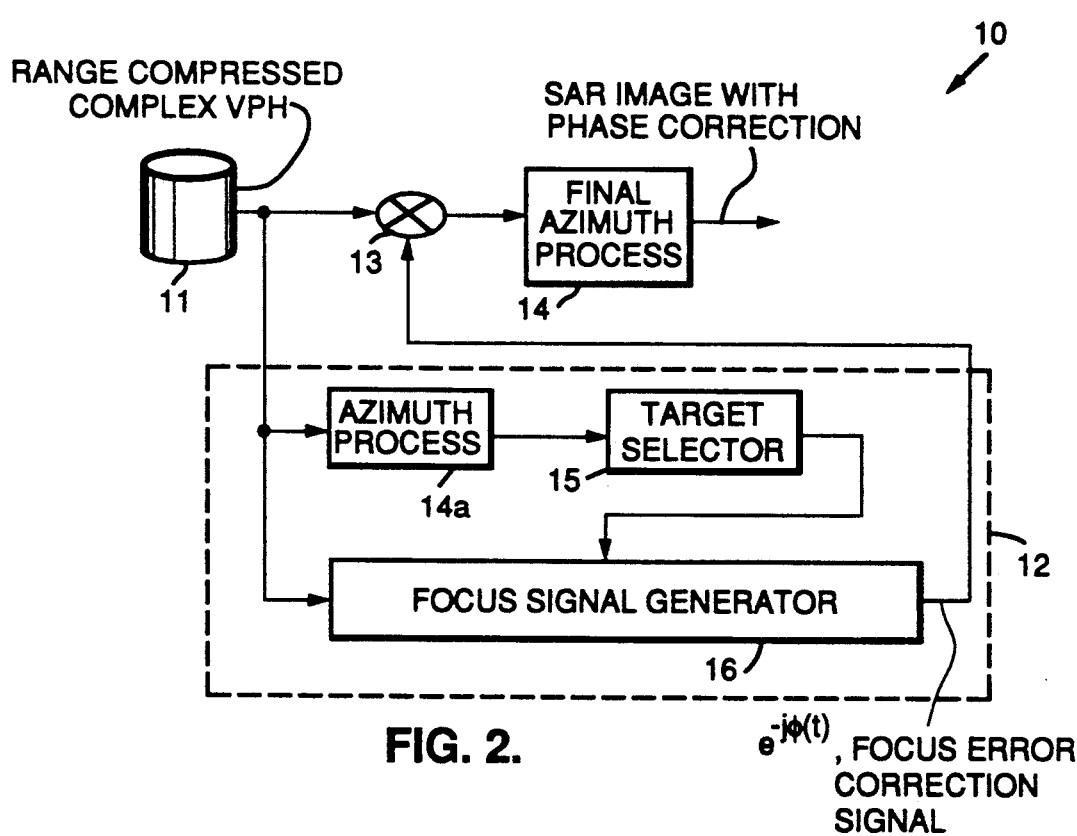
FIG. 2 is a basic block diagram of an autofocus processor in accordance with the principles of the present invention particularly detailing the focus error estimation processing thereof.

The general block diagram for most autofocus processors also looks similar to FIG. 1. However, the unique aspects of the present autofocus processor 10 is in the focus error estimation processor 12. This focus error estimation processor 12 is explained in more detail with reference to FIG. 2. The focus error estimation processor 12 is comprised of an azimuth process 14a that is substantially the same as that of the final azimuth process 14, a target selector 15, and a focus signal generator 16. The azimuth process 14a produces a SAR image, which can be defocused. Output from the azimuth process 14a is coupled to a target selector 15 that identifies and locates potential targets in the SAR image output by the azimuth process 14a and generates a target list comprised of the range bin and azimuth location of each selected target. Using the target list as a pointer, the focus signal generator 16 retrieves the range bins containing the selected targets from the range compressed VPH data, performs bandpass filtering and pulse pair processing, and generates a phase error correction signal.

Figure 3:
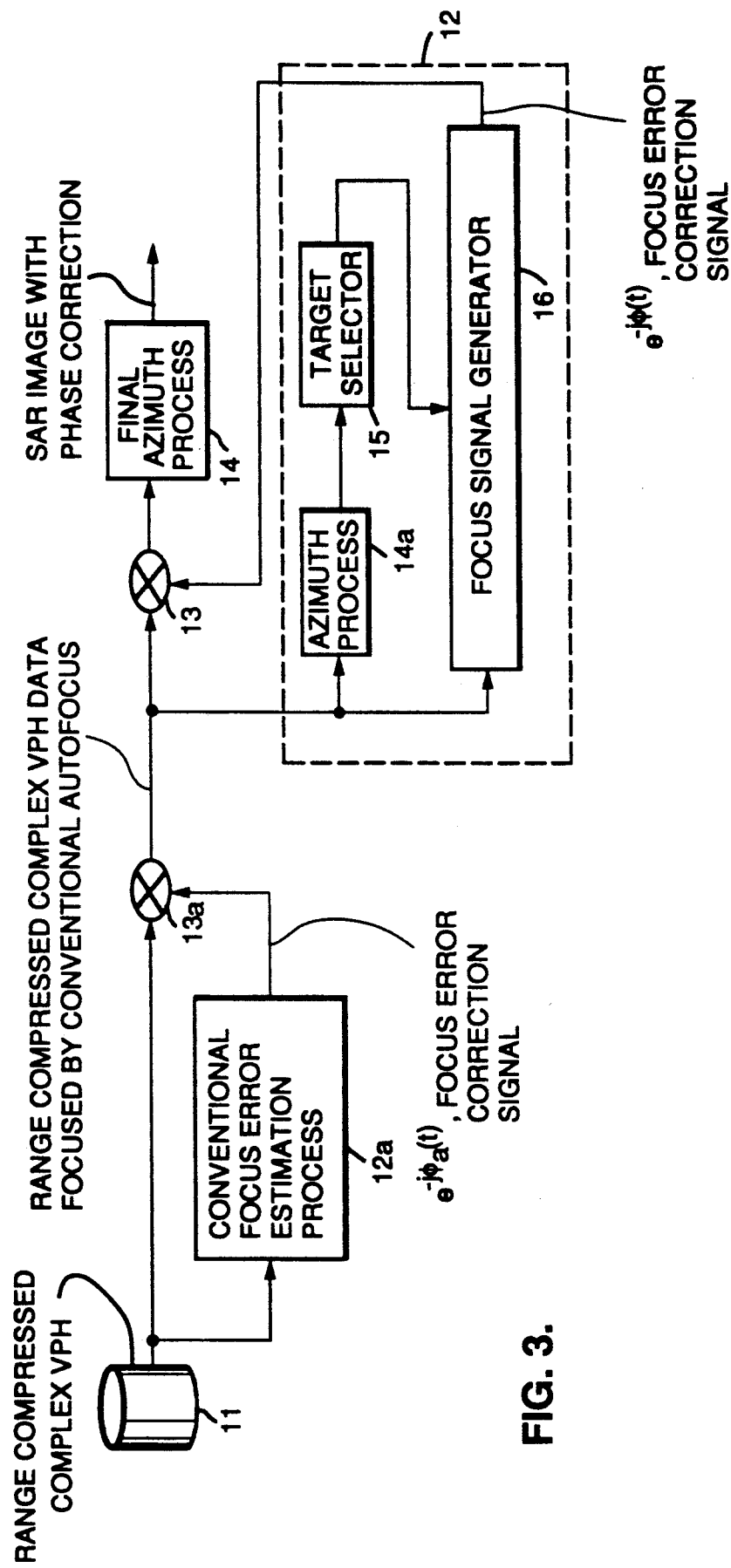
FIG. 3 is an alternate implementation of an autofocus processor in accordance with the principles of the present invention where the autofocus processing of the present invention operates on the range compressed VPH data that is first processed by the conventional autofocus.

FIG. 3 illustrates an alternate implementation of the present invention where the autofocus processing of the present invention is preceded by the conventional autofocus processing. In the alternate implementation, the conventional autofocus (the map drift method or the phase difference method) is used to remove a phase error of lower order, particularly a quadratic phase error, from the range compressed complex VPH data. If a quadratic phase error is removed first, then scatterers' response will have a smaller azimuth extent when processed subsequently by the azimuth processor 14a. As a result, the bandpass filtering process 25 in the focus error estimation process 16 employs a narrower window width, making it more probable that only a single scatterer be bandpass-filtered. FIG. 3 is a preferred implementation of the present invention.

Figure 4:
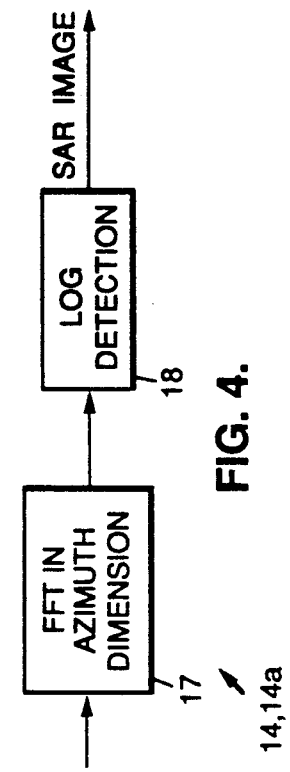
FIG. 4 illustrates the processes contained within the azimuth processing portion of the autofocus processor of FIGS. 2 and 3.
Figure 5:
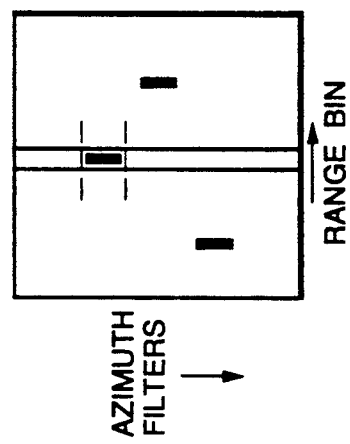
FIG. 5 represents a SAR image display illustrating azimuth filters versus range bins useful in illustrating the processing described with reference to FIG. 6.

FIG. 4 illustrates the azimuth and final azimuth processes 14, 14a. The azimuth and final azimuth processes 14, 14a are each comprised of a fast Fourier transform (FFT) process 17 which first processes the range compressed complex VPH data in the azimuth dimension and then transfers the processed data to a log detection process 18 which produces the SAR image. FIG. 5 represents a display illustrating a typical SAR image, a two dimensional array of pixels consisting of azimuth filters by range bins. An image representation in terms of azimuth filters and range bins is useful in illustrating the processing of the present invention. FIG. 5 shows a plurality of target scatterers displayed on the display screen, with a particular range bin of interest outlined by the vertical lines adjacent the central scatterer on the display. The dashed horizontal lines represent the azimuth extent of the scatterer's response.

Figure 6:
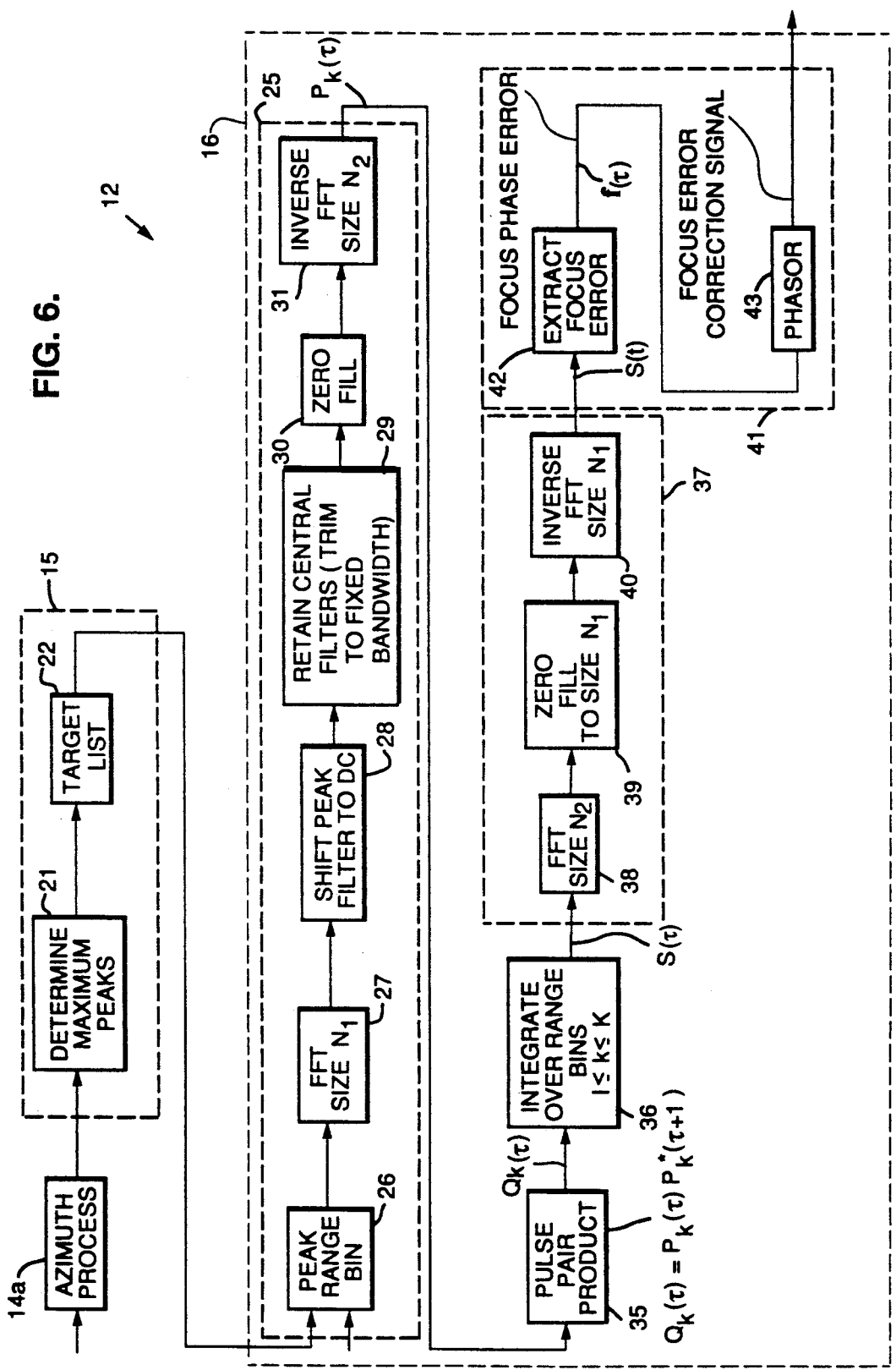
FIG. 6 shows a detailed block diagram showing the focus error estimation process performed in the autofocus processor of the present invention.

FIG. 6 shows a detailed block diagram of the focus error estimation processor 12 in accordance with the principles of the present invention. The focus error estimation processor 12 comprises the azimuth process 14a, the target selector 15, and the focus signal generator 16. The azimuth process 14a that is detailed in FIG. 4, outputs a SAR image without a final phase correction. This SAR image is then processed by a target selector 15 that selects potential targets contained in the SAR image for subsequent phase extraction processing by the focus signal generator 16. The target selector 15 comprises a maximum peak detector 21 that identifies and locates potential targets and a target list process 22 that generates a target list comprised of the range bin and azimuth location for each selected target. The output of the peak detection process 21 is stored as a target list 22 having K reference targets therein, which are stored in terms of range bin number and azimuth filter number of the detected peak. The target list 22 functions as a pointer to the locations of potential targets contained in the range compressed complex VPH data stored in the storage means 11.

The selected range bins from the range compressed complex VPH data are then processed by means of a bandpass filter process 25 which comprises a plurality of processing steps. The bandpass filter process 25 uses the pointer from the target list 22 to select a range bin containing the $k^{th}$ reference target 26. The data contained in the range bin is Fourier transformed by means of FFT 27 of size $N_1$. The peak filter contained in the Fourier transformed data is shifted to a DC filter 28. The central filters around the peak are retained in step 29 and the remaining filters are zeroed in step 30 in order to trim the signal to a fixed bandwidth. The data in the retained central filters are then processed by the inverse fast Fourier transform (IFFT) 31 of size $N_2$ to produce a signal $P_k(\tau)$ that contains phase information of the $k^{th}$ reference target. The signal $P_k(\tau)$ is then processed in step 35 to produce a pulse pair product. This is accomplished in accordance with the equation $Q_k(\tau)=P_k(\tau)P_k^*(\tau+1)$. The pulse pair processing produces a phasor that contains the differential phase of the desired focus correction signal as its phase.

The signal $Q_k(\tau)$ is integrated in step 36 over all of the selected targets to produce $S(\tau)$ that is a summed history of the phase increments. This signal is then interpolated at 37 to produce the signal $S(t)$ having the proper time increment: $t=\tau N_2/N_1$. This is achieved by performing Fourier transform of size $N_2$ on the signal $S(\tau)$ in step 38, zero filling its output to size $N_1$ in step 39, and performing inverse Fourier transform of size $N_1$ in step 40 to produce $S(t)$. The phase error correction signal associated with the SAR image is produced from this signal $S(t)$ in a phasor generator 41. The focus error extraction process comprises processing the signal $S(t)$ in accordance with a recursion relation $\phi(t+1)=\phi(t)+\text{Arg}\{S(t)\}$ with the initial condition $\phi(1)=0$. This produces an estimated phase error $\phi(t)$ in step 42. The final phase error correction signal $\{e^{-j\phi(t)}\}$ is then created in step 43.

In summary, the focus error estimation processor 12 is comprised of seven primary parts. The first of these parts produces a SAR image (azimuth process 14a) and the next searches for potential targets, comprising scatterers, discretes, or point targets (the target selector 15). For each reference target, a phase history is extracted and summed with appropriate weighting over all targets. This is performed by the bandpass filtering process 25, pulse pair product process 35 and integration step 36. After the pulse pair products from all reference targets are summed, it is first interpolated to the signal having the proper time increment in step 37, and then the phase is extracted and used to create the final phase error correction signal $\{e^{-j\phi(t)}\}$ (phasor generator 41). The last 5 of 7 primary parts constitute the focus signal generator 16. Each of these process steps is discussed in more detail below.

The summation over scatterers process is utilized in the present invention in comparison with a summation over range bins because there might be two or more useful scatterers in a single range bin, or there may be cases where a single scatterer is so strong that its sidelobe response dominates other responses in adjacent range bins and to include it more than once would improperly emphasize its contribution, or there may not be a proper target at all in some range bins.

With reference again to FIG. 2, it illustrates how the reference scatterer selection criteria avoids the problems cited in the Background section hereof. The scatterers are cataloged by performing conventional azimuth processing in step 14a to produce a SAR image followed by an isolation test performed by the target selector 15. This ensures that the target is the largest response or scatterer in its surrounding neighborhood. Isolating the largest scatterer in the neighborhood is part of the foundation for the choice of weighting functions. The neighborhood should have an azimuth extent larger than the maximum anticipated, uncorrected impulse response width and be large enough to encompass the full range of the anticipated residual phase errors. If the conventional autofocus processing is not employed as in FIG. 2, uncorrected impulse response width is usually controlled by the quadratic phase error. This extent is conveniently approximated by the achievable resolution without autofocus. If the conventional autofocus processing is used to remove a phase error of low order as in FIG. 3, then the azimuth extent can be reduced accordingly. The extent in range is at least one range bin on either side of the peak.

The algorithmic approach to finding adequately isolated peaks may be relatively crude and subject to significant refinement and trade-offs for efficiency. The present invention utilizes a region such as:

```
        +
        +
        +
      + + +
      + + +
      + + +
        +
        +
        +
```

Figure 7:
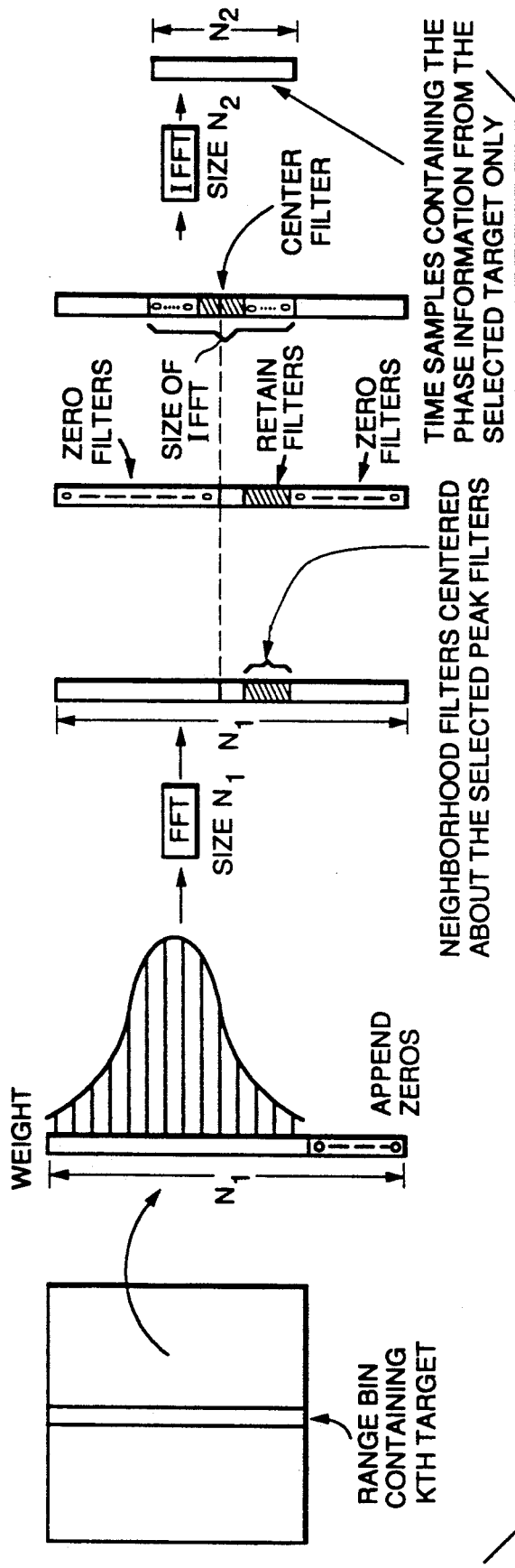
FIG. 7 is a diagram illustrating the bandpass filtering aspects of the autofocus processor of the present invention.

FIG. 7 shows the bandpass filtering process in detail where non-interfering phase history is obtained from each selected target. To capture non-interfering phase history from a selected target, the range bin containing the target is retrieved from the range compressed complex VPH data, multiplied by a sidelobe suppression amplitude weighting function, zero-filled to size $N_1$, and processed by the FFT of size $N_1$. The complex FFT filter that would have resulted in the peak response if detected is shifted to a DC filter. The neighborhood complex FFT filters centered about the peak filter are retained and the remainder of the filters are set to zeros. The number of FFT filters retained is chosen such that the bandwidth spanned by the filters is sufficiently wide enough to encompass uncorrected impulse response width from the residual phase error, by narrow enough to exclude sidelobe responses from potential nearby targets. FFT filters padded with zeros are then processed by the inverse FFT of size $N_2$, ($N_2 \leq N_1$). Resulting time samples contain the phase error information from the selected target only. For computational efficiency, the size ($N_2$) of the inverse FFT can be set to approximately twice the azimuth extent of the neighborhood. The result is that the phase history is resampled at a reduced rate $N_1/N_2$.

The computational process or formula $Q(\tau)=P(\tau)P^*(\tau+1)$ is the definition of pulse pair processing which is employed in the present invention. In a recent article entitled, "A New Phase Correction Method for Synthetic Aperture Radar," by Sandia National Laboratory, an algorithm was suggested using the formula:

$$\theta(\tau) = \frac{\Sigma Im\{P^*(\tau)P(\tau)\}}{\Sigma |P(\tau)|}$$

This is appropriate for continuous phase history data. However, for a sample data system (pulse radar), it is very handy to introduce the definition of phase history time difference. The above equation reduces to the following expressions:

$$\Delta\theta(\tau) = \frac{\Sigma Im\{P^*(\tau)\Delta P(\tau)\}}{\Sigma |P(\tau)|}$$

where $$\Delta P(\tau) = P(\tau+1) - P(\tau).$$

When these two expressions are combined, a significant simplification is achieved because the term corresponding to $P^*(\tau)P(\tau)$ has no imaginary part:

$$\Delta\theta(\tau) = \frac{\Sigma Im\{P^*(\tau)\Delta P(\tau+1)\}}{\Sigma|P(\tau)|}$$

The phase difference processing represented by $P^*(\tau)P(\tau+1)$ and shown in the third expression can be iterated until the pulse pair product sum has no imaginary part. There is a noniterative solution to this problem. The phase difference which, after correction, results in a zero imaginary component of the sum after the next iteration is given by:

$$0 = \Sigma Im\{P^*(\tau)P(\tau+1)\exp(-j\Delta\theta(\tau))\} = Im\{\exp(-j\Delta\theta(\tau))\Sigma P^*(\tau)P(\tau+1)\}.$$

It is important is to keep the sum of pulse pair products in complex form so that the anticipated phase correction may be directly applied in such a way that the imaginary part is exactly zero after correction. Then, it is simple to derive from the above equation that $$\Delta\theta(\tau) = Arg\{\Sigma P^*(\tau)P(\tau+1)\}.$$

This expression also shows that signals are weighted in proportion to their power for an overall least squared phase error.

The final processing step, the phase error extraction step 42, is preceded by the time interpolation process which restores the signal to the original time scale by operating on the sum of pulse pair products. The focus error correction phase is created by means of a simple phase difference accumulator, which implements the recursion relation $\phi(t+1) = \phi(t) + Arg(S(t))$ with the initial condition $\phi(1) = 0$.

The features of the processor 10 are such that it provides for a phase history of practically unlimited order versus a phase history of low order, it degenerates to point target focusing, it provides for automatic scatterer identification and location, it uses many discretes when available, it provides for a means of alternate weighting of pulse pair products during the integration processing, such as discrete weighting based on signal to noise ratio and isolation from other discretes, it is insensitive to clutter Doppler centroid variations, and it requires minimum iteration. This present processor 10 produces a comprehensive time series of phase corrections in contrast to the more traditional methods which estimate one or more phase polynomial coefficients. The bandwidth of the time series estimate is controlled by the azimuth extent or the neighborhood size processed around each reference target.

The processor 10 automatically determines the relative quality of each reference target. If one reference target is much stronger than all the rest, the result is, effectively, an automatic point target focus correction. If no single scatterer dominates, then the processor 10 finds an estimate which fits the stronger scatterers better than it fits the weaker or noisier scatterers. The processor 10 uses all the targets that are adequately isolated. This may improve accuracy in cases where there are only a few weak discretes to work with. Once the scatterers are isolated, the actual computation per reference target is much smaller than that associated with processing each range bin without resampling. The processor 10 minimizes iteration by using a weighting that is relatively independent of how large the focus error is in the raw data and using pulse pair processing to directly determine the phase correction required to align each of the sums of pulse pair products.

While it is not possible to prove analytically that additional iterations would not yield significant improvement, the present process 10 incorporates features that are intended to converge immediately. Pull-in range is controlled by a single parameter in the process 10. Experimental verification includes measurement of the RMS phase error after the first pass compared to the final estimated phase based on multiple iterations as will be described in more detail below.

The following represents a summary of test results for the processor 10. The autofocus method was implemented on a VAX 8350 using a Floating Point System Array Processor 164. The effectiveness and power of the autofocus processor 10 were demonstrated by evaluating its performance using high resolution SAR images that included radar returns from ground order of battle targets such as tanks, armored personnel carriers, self-propelled artillery, as well as engineering corner reflectors. Also included in the SAR images were returns from deciduous trees (oak and sycamores) and shrub brush. The autofocus processor 10 produced an optimal phase correction signal when isolated targets such as engineering corner reflectors were selected by the scatterer detector and included in the target list. For the test, several high resolution SAR scenes were chosen that required a combination of a conventional autofocus (phase difference or map drift method) and a single scatterer manual focus to produce sharp, well focused imagery. Tests have shown that the autofocus processor 10 produces high quality imagery in a single iteration without manual intervention.

Figure 8:
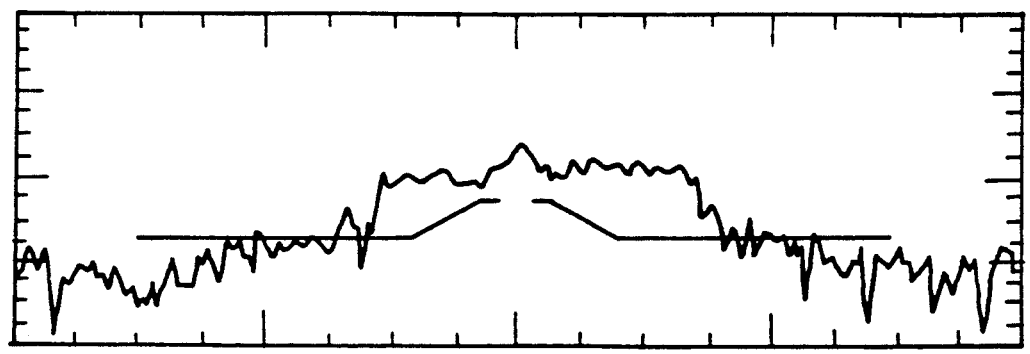
FIG. 8 shows a graph of test data illustrating the azimuth impulse response of a point scatterer with conventional autofocus processing only.
Figure 9:
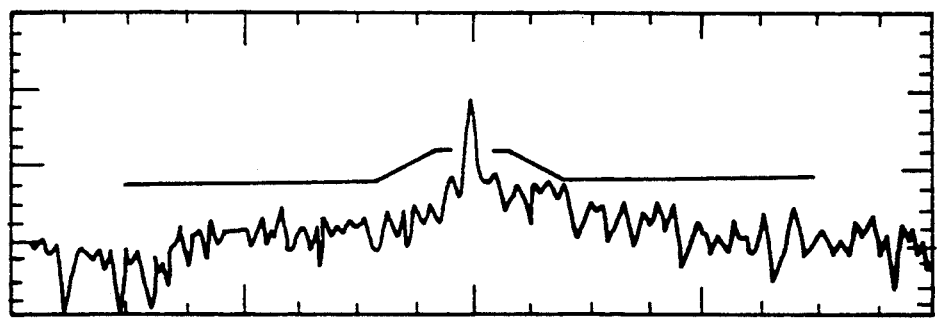
FIG. 9 shows a graph of test data illustrating the azimuth impulse response of a point scatterer generated using the present invention and using the manual selection and processing of a single discrete reference target.
Figure 10:
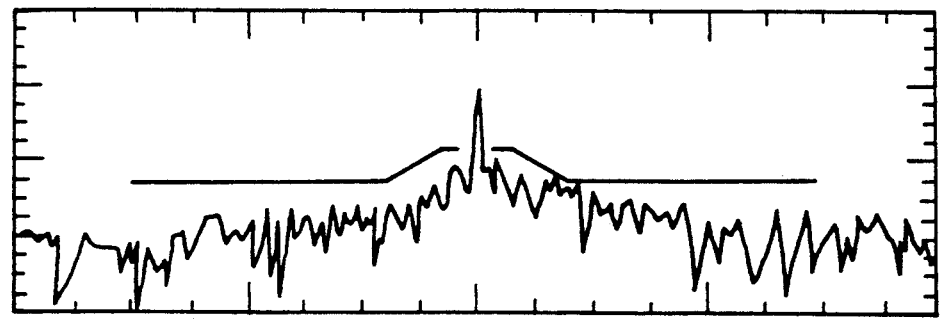
FIG. 10 shows a graph of test data illustrating the azimuth impulse response of a point scatterer after focusing with phase extracted from multiple targets using the present invention with automatic target selection.

FIG. 8 shows the azimuth impulse response of a corner reflector after the scene was focused by the conventional autofocus technique. The scene was then focused with a single iteration of the single target discrete autofocus. The scene was also focused with a single iteration of the autofocus processor 10 using multiple target discrete autofocus. The resulting azimuth impulse response is shown in FIGS. 8 and 9, respectively. It is clear from these results that the autofocus processor 10 produces an optimal phase correction signal.

The autofocus processor 10 produces a good phase correction signal even when only the ground order of battle targets were included in the target list without any isolated point targets. Again, only one focus iteration was required. Such scenes generally cannot be precisely focused if a scattering center of a ground order of battle target is used as an isolated point target in the single target discrete autofocus method. In the most stringent test, the multiple discrete autofocus processor 10 was forced to select radar returns from trees only. The results were far superior to the images focused by the fifth order phase difference method. Of course, the results were not as good as when the target list contained man made targets. For the trees only test case, a second iteration improved the imagery. Additional iterations showed little improvement, however.

Thus there has been described a new and improved method and apparatus that automatically corrects synthetic array radar focus errors. It is to be understood that the above-described embodiment is merely illustrative of some of the many specific embodiments which represent applications of the principles of the present invention. Clearly, numerous and other arrangements can be readily devised by those skilled in the art without departing from the scope of the invention:

What is claimed is:

1. A method of automatically correcting focus errors associated with synthetic array radar signals, said method comprising the steps of:

processing the synthetic array radar signals to produce a SAR image;

identifying and locating a set of potential reference targets contained in the SAR image;

storing the range bin and azimuth location of the potential reference targets in a target list;

bandpass filtering the synthetic array radar signals associated with each potential reference target to remove interference therefrom;

forming a pulse pair product of phase history samples from each reference target to form a differential phase history function;

integrating the pulse pair products over all reference targets to obtain a summed differential phase history function;

processing the integrated differential phase history function to time-interpolate and restore it to the original time scale and number of data samples;

extracting phase data from the interpolated differential phase history function; and computing a focus error associated with the synthetic array radar signals by computing a predetermined recursion relation using extracted phase data as a phase slope.

2. The method of claim 1 wherein the step of identifying a potential reference target comprises the step of:

determining that a potential reference target comprises the largest peak response located within a predetermined surrounding neighborhood.

3. The method of claim 2 wherein the step of determining that a potential reference target comprises the largest peak response located within a predetermined surrounding neighborhood comprises the step of:

determining an azimuth extent greater than the maximum uncorrected impulse response width which is large enough to encompass the bandwidth of the residual phase error.

4. The method of claim 3 wherein the step of determining an azimuth extent greater than the maximum uncorrected impulse response width which is large enough to encompass the bandwidth of the residual phase error comprises the steps of:

determining an extent in range one range bin on either side of the peak signal identifying a potential reference target.

5. The method of claim 1 wherein the step of bandpass filtering for a $k^{th}$ potential reference target in the target list to remove the interference therefrom comprises the steps of:

applying sidelobe suppression weights to the retrieved range bin data;

appending zeros the weighted range bin data and performing an FFT;

shifting a complex FFT filter would have resulted in the peak response if detected to a DC filter; and appending zeros to the retained FFT filters and performing an inverse FFT of size at least twice the number of FFT filters retained to obtain an interference-free radar return $P_k(\tau)$ from the $k^{th}$ target in the target list.

6. The method of claim 1 wherein the step of forming the pulse pair product to provide the differential phase history comprises the steps of:

computing the pulse pair product using the equation $Q_k(\tau) = P_k(\tau) P_k^*(\tau+1)$.

7. The method of claim 1 wherein the step of integrating the pulse pair product signals over all potential reference targets in the target list to reduce target-dependent phase estimation errors comprises the steps of:

summing $Q_k(\tau)$ into an accumulator by means of the equation $S(\tau) = \Sigma Q_k(\tau)$.

8. The method of claim 1 wherein the step of processing the integrated pulse pair product signals to time-interpolate and to restore the signals to the original time scale comprises the steps of:

processing the signal $S(\tau)$ by an FFT having a size of the inverse FFT employed during the bandpass filtering process; and appending zeros to the FFT output and performing inverse FFT having the size of the FFT employed during the bandpass filtering process to produce the signal $S(t)$ that has the original time scale and number of data samples.

9. The method of claim 1 wherein the step of extracting phase data from the interpolated differential phase history $S(t)$ and computing the focus error associated with the synthetic array radar data comprises the steps of:

recursively computing the recursion relation $\phi(t+1) = \phi(t) + \text{Arg}\{S(t)\}$ with an initial condition $\phi(1) = 0$.

10. The method of claim 1 which further comprises the initial processing steps of:

autofocus processing the synthetic array radar signals to estimate a lower order phase error; and multiplying the synthetic array radar signals with the phase error correction signal to produce synthetic array radar signals with a reduced lower order phase error.

11. The method of claim 1 which further comprises the initial processing steps of:

autofocus processing the synthetic array radar signals to estimate a lower order phase error; and multiplying the synthetic array radar signals with the phase error correction signal to produce synthetic array radar signals with a quadratic phase error.

12. The method of claim 1 which further comprises the initial processing steps of:

autofocus processing the synthetic array radar signals to estimate a lower order phase error; and multiplying the synthetic array radar signals with the phase error correction signal to produce synthetic array radar signals with a cubic phase error.

13. A method of automatically correcting focus errors present in synthetic array radar signals that comprises the steps of:

processing the synthetic array radar signals to produce a SAR image;

identifying peaks contained in the SAR image;

storing the location of the peaks in a target list;

extracting the differential phase history for each reference target in the target list, using bandpass filter processing followed by pulse pair processing;

summing the differential phase history of all targets in the target list to substantially reduce target-dependent phase errors; and computing a focus error from the summed differential phase histories.

* * * * *